(12) United States Patent
Marwah et al.

(10) Patent No.: US 9,646,053 B2
(45) Date of Patent: May 9, 2017

(54) OLTP COMPRESSION OF WIDE TABLES

(71) Applicant: Oracle International Corporation, Redwood Shores, CA (US)

(72) Inventors: Vineet Marwah, San Ramon, CA (US); Ajit Mylavarapu, Mountain View, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 124 days.

(21) Appl. No.: 13/797,063

(22) Filed: Mar. 12, 2013

(65) Prior Publication Data
US 2014/0279959 A1  Sep. 18, 2014

(51) Int. Cl.
*G06F 17/30* (2006.01)

(52) U.S. Cl.
CPC .............. *G06F 17/30489* (2013.01)

(58) Field of Classification Search
USPC .................. 707/793, 795, 763, 765
See application file for complete search history.

(56) References Cited

U.S. PATENT DOCUMENTS

| | | | |
|---|---|---|---|
| 5,265,246 A | 11/1993 | Li | |
| 5,278,783 A * | 1/1994 | Edmondson | G06F 7/508 708/711 |
| 7,031,994 B2 | 4/2006 | Lao et al. | |
| 7,272,589 B1 | 9/2007 | Guay | |
| 7,496,589 B1 | 2/2009 | Jain et al. | |
| 7,580,927 B1 * | 8/2009 | Abugov | G06F 17/30271 |
| 8,392,382 B2 * | 3/2013 | Marwah | G06F 17/30377 707/607 |
| 8,832,142 B2 | 9/2014 | Marwah et al. | |
| 2002/0075714 A1 * | 6/2002 | Pereira | G06F 17/30982 365/49.1 |
| 2004/0078461 A1 * | 4/2004 | Bendich | G06F 11/3495 709/224 |
| 2006/0074977 A1 * | 4/2006 | Kothuri | G06F 17/30327 |
| 2007/0109155 A1 * | 5/2007 | Fallon | G06T 9/00 341/50 |

(Continued)

OTHER PUBLICATIONS

Ailamaki, Anastassia, et al, "Weaving Relations for Cache Performance," Proceedings of the $27^{th}$ International Conference on Very Large Data Bases, Rome, Italy, Sep. 11-14, 2001, 14 pages.

(Continued)

*Primary Examiner* — Syed Hasan
*Assistant Examiner* — Ahmed Abraham
(74) *Attorney, Agent, or Firm* — Hickman Palermo Becker Bingham LLP (57) ABSTRACT

A data block stores one or more rows of a database table or relation. An entire row may not fit in a data block. Part of the row is stored in one data block, and another part is stored in another data block. Each row part is referred to herein as a row segment and the data blocks are referred to as row-segmented data blocks. Data block dictionary compression is used to compress row-segmented data blocks. Each data block contains a dictionary that is used to compress rows in the data block, including row segments. The dictionary in a data block is used to compress row segments in the data block. Hence, multiple dictionaries may be used to decompress a row comprised of row segments.

8 Claims, 3 Drawing Sheets

(56) References Cited

U.S. PATENT DOCUMENTS

| | | | |
|---|---|---|---|
| 2008/0050025 A1* | 2/2008 | Bashyam | G06T 9/002 382/238 |
| 2008/0294863 A1* | 11/2008 | Faerber | H03M 7/3084 711/170 |
| 2010/0030796 A1* | 2/2010 | Netz | G06F 17/30501 707/756 |
| 2010/0281004 A1* | 11/2010 | Kapoor | G06F 17/30501 707/693 |
| 2012/0054225 A1* | 3/2012 | Marwah | G06F 17/30477 707/769 |
| 2015/0149479 A1 | 5/2015 | Geringer et al. | |

OTHER PUBLICATIONS

Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).

U.S. Appl. No. 14/092,503, filed Nov. 27, 2013, Notice of Allowance.

U.S. Appl. No. 14/092,503, filed Nov. 27, 2013, Office Action.

* cited by examiner

OLTP COMPRESSION OF WIDE TABLES

FIELD OF THE INVENTION

The present application is related to database systems, and in particular, storing database data for efficient access.

BACKGROUND

Computers are used to store and manage many types of data. Relational and object-relational databases that are managed by database servers for database clients are an important form of storing and managing data. How database data is physically stored can have a significant effect on (1) how much storage space the database consumes, and (2) how efficiently the database data can be accessed and manipulated. If physically stored in an inefficient manner, the database data may consume more storage space than desired, and result in slow retrieval, storage and/or update times.

Data in a relational or object-relational database is stored as relations comprising rows that share the same columns. The rows are stored in data blocks. Described herein are techniques for compressing data blocks that store rows.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are dictionary based compression techniques referred to herein as dictionary compression. In dictionary compression, one or more column values are represented by a token, which is typically much smaller than the one or more values the token represents. A token dictionary ("dictionary") maps tokens to values. Occurrences of a value in a column are replaced by the token mapped by an entry in the token dictionary to the value. A value that is mapped to a token by a dictionary is referred to herein as the actual value. With respect to a token dictionary, the set of actual values that are to be encoded according to the dictionary is referred to herein as the domain of the dictionary.

In data block domain dictionary compression, a token dictionary is stored in a data block. The domain of the token dictionary is the data block, and it may be used to tokenize column values of columns of rows in the data block. In other words, the domain of the dictionary in a data block is the data block; the dictionary does not pertain to other data blocks. The dictionary is referred to herein as a data block level dictionary.

A data block stores one or more rows of a database table or relation. For each row in the data block, one or more column values of the row are stored contiguously.

An entire row may not fit in a data block. In such situations, part of a row is stored in one data block, and another part is stored in another data block. Each row part is referred to herein as a row segment. A data block that contains a row segment is referred to as containing the row. A row having a row segment in a data block is referred to herein as being contained by the data block. Thus, a row comprising multiple row segments may be contained by multiple data blocks. A data block containing a row segment is referred to herein as a row-segmented data block.

In various approaches to data block dictionary compression, dictionary compression is not used to compress data blocks that are row-segmented. However, in approaches that are discussed herein, data block dictionary compression is used to compress row-segmented data blocks.

Exemplary Database System

Embodiments of the present invention are implemented in the context of a database system. A database system includes at least one database server that manages a database. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that are stored on a persistent or volatile memory mechanism, such as a set of hard disks. Database metadata defines database objects, such as tables and columns therein, object tables, views, or complex types, such as object types, and functions.

Application clients interact with a database server to access data in the database managed by the database server. Clients access the database data by submitting to the database server commands that cause the database server to perform operations on data stored in a database. A database command may be in the form of a database statement that conforms to a database language, such as the Structured Query Language (SQL). There are many different versions of SQL, some versions are standard, and some proprietary, and there are a variety of extensions. Data manipulation language ("DML") statements are issued to a database server to query or request changes to a database. Data definition language ("DDL") instructions are issued to a database server to create or configure database objects, such as tables, views, or complex data types, or to control how DML statements are to be processed.

According to an embodiment, an application client issues database server commands via a database session. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session.

Data Blocks with Row Segments

A data block is a unit of persistent storage that is used by a database server to store database rows and/or row segments. When rows are read from persistent storage, a data block containing the row is copied into a data block buffer in volatile and/or main memory of a database server. A data block usually contains multiple rows, and data block metadata describing the contents of the data block. Metadata includes control and formatting information, such as offsets to sequences of bytes representing rows or other data structures, and a list of transactions affecting a row. According to an embodiment of the present invention, the metadata includes a data block level token dictionary, the domain of which is the data block which contains the data block level token dictionary. Thus, the dictionary encodes only the column values of rows contained within the data block.

A data block is referred to as being atomic because, at least in part, a data block is the smallest unit of database data a database server may request from a persistent storage device. For example, when a database server seeks a row that is stored in a data block, the data block may only read the row from a persistent storage device by reading in the entire data block.

A data block is associated with a data block address that uniquely identifies the data block and the data block's storage location within a storage device. A database server may request from a storage device a data block by data block address, or even by primary block address ranges of data blocks.

Figure 1:
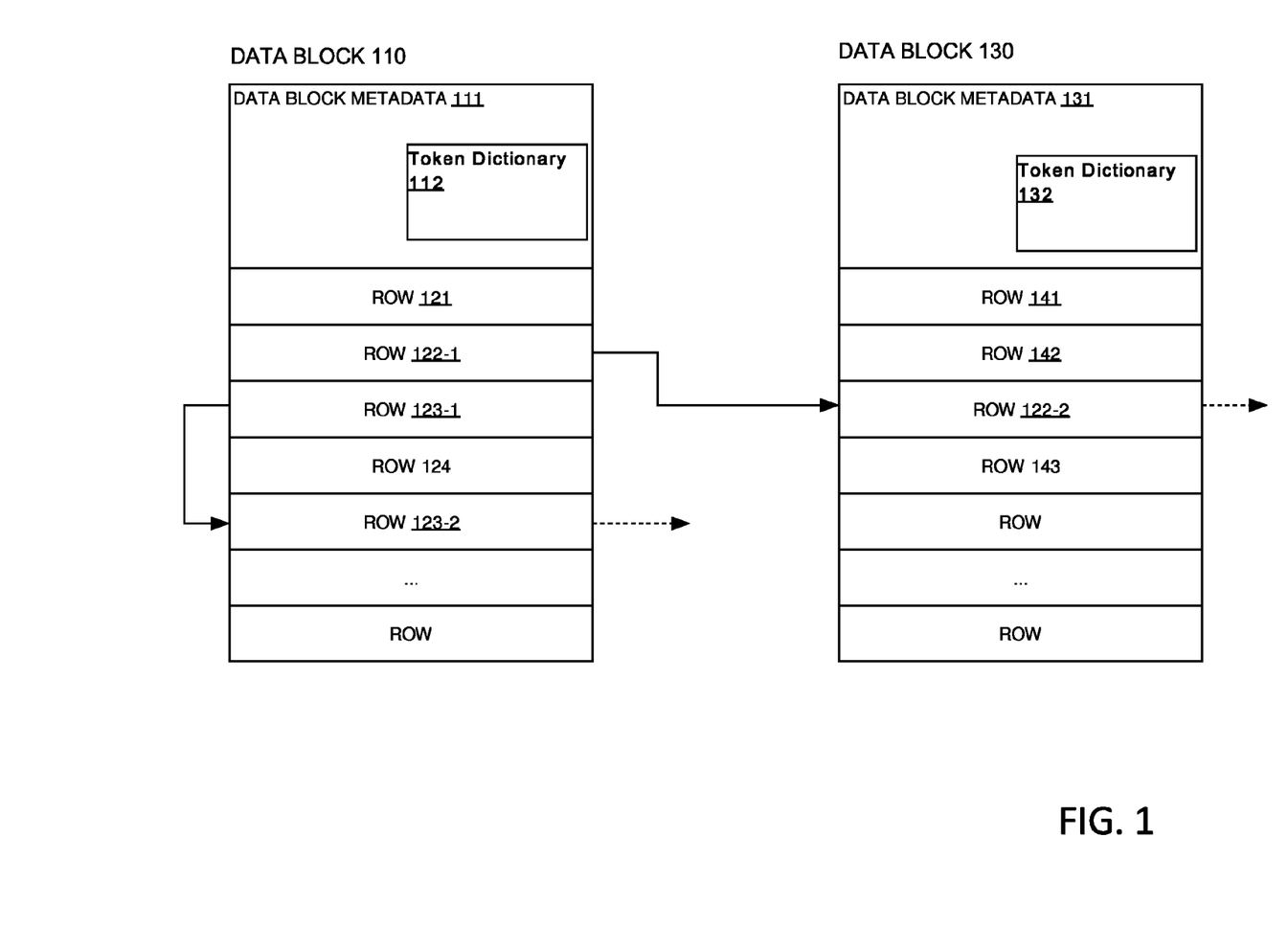
FIG. 1 is a diagram depicting a data blocks compressed using dictionary compression according to an embodiment of the present invention.

FIG. 1 depicts data blocks encoded according to data block domain compression techniques described herein. Referring to FIG. 1, it depicts data block 110 and data block 130. Data block 110 includes data block metadata 111, which contains token dictionary 112, a data block level token dictionary for data block 110. Similarly, data block 130 includes data block metadata 131, which contains token dictionary 132, a data block level token dictionary for data block 110.

Data block 110 and data block 130 contain data block row entries. A row entry is a contiguous set of bytes in an address space occupied by a data block, the contiguous set of bytes storing one or more column values of a row and row control data. Each row entry is either a row or row segment. A data block that stores a row entry that is either an entire row or a row segment of a row is referred to herein as containing the row. Thus, a row comprising multiple row segments may be contained by multiple data blocks.

The row entries of data block 110 include a row entry for each of row 121, row segment 122-1, row segment 123-1, row 124, row segment 123-2, as well one or more other rows and/or row segments not labeled. Thus, data block 110 contains row 121, row 122, row 123, row 124, and other rows not labeled.

The row entries of data block 130 include a row entry for each of row 141, row 142, row segment 122-2, row segment 143, as well one or more other rows. Thus, data block 110 contains rows 141, row 142, row 122, row 143, and other rows not labeled.

As further clarification, a segmented row is a row where all the column values of the row are not stored contiguously in a data block. Row segments of a row may be stored in the same data block or different data blocks.

Data block 110 contains two segmented rows. Specifically, data block 110 contains row segment 122-1 of row 122. The other row segment of row 122, row segment 122-2, is stored in data block 130. The other segmented row contained in data block 110 is row 123. Row 123 comprises row segment 123-1 and row segment 123-1, both row segments of which are stored in data block 110.

According to an embodiment of the present invention, row segments are chained because the row segments are linked in order by links contained in the row segments. A segmented row comprises as the first row segment a head row segment, followed by one or more ordered overflow row segments. Row control data in a row segment indicates whether a row segment is a head row segment or an over flow row segment. The row control data contains a row segment link to the next overflow row segment in order and/or to a row segment previous in order.

Referring to FIG. 1, row segment 122-1 is a head row segment of row 122 and row segment 122-2 is an overflow row segment of row 122; row segment 123-1 is a head row segment of row 123 and row segment 123-2 is an overflow row segment of row 123. Head row segment 122-1 includes a link to overflow row segment 122-1, while head row segment 123-1 contains a link to row segment 123-2.

A row segment link is data indicating the location of a row segment within a data block. A row segment link may comprise a data block address of a data block and an offset indicating the location of the row segment within the data block. The offset may be a number of bytes offset or index indicating the ordinal position of the row among the row entries within the data block. A link from a row segment to another row segment within the same data block may be a relative offset from the row segment.

For purposes of illustration, two row segments are depicted for row 122 and row 123. However, a segmented row may have more than two row segments. For example, row 122-2 may be linked to another overflow row not depicted and row 123-2 may be linked to another over flow row not depicted.

A row with row segments in multiple data blocks is referred to herein as a spanning row. A data block that contains an over flow row segment but not the head row segment is referred to herein as an overflow data block. A non-segmented row or a head row is referred to herein as a non-overflow row.

Decoding Data Blocks with Row Segments

Figure 2:
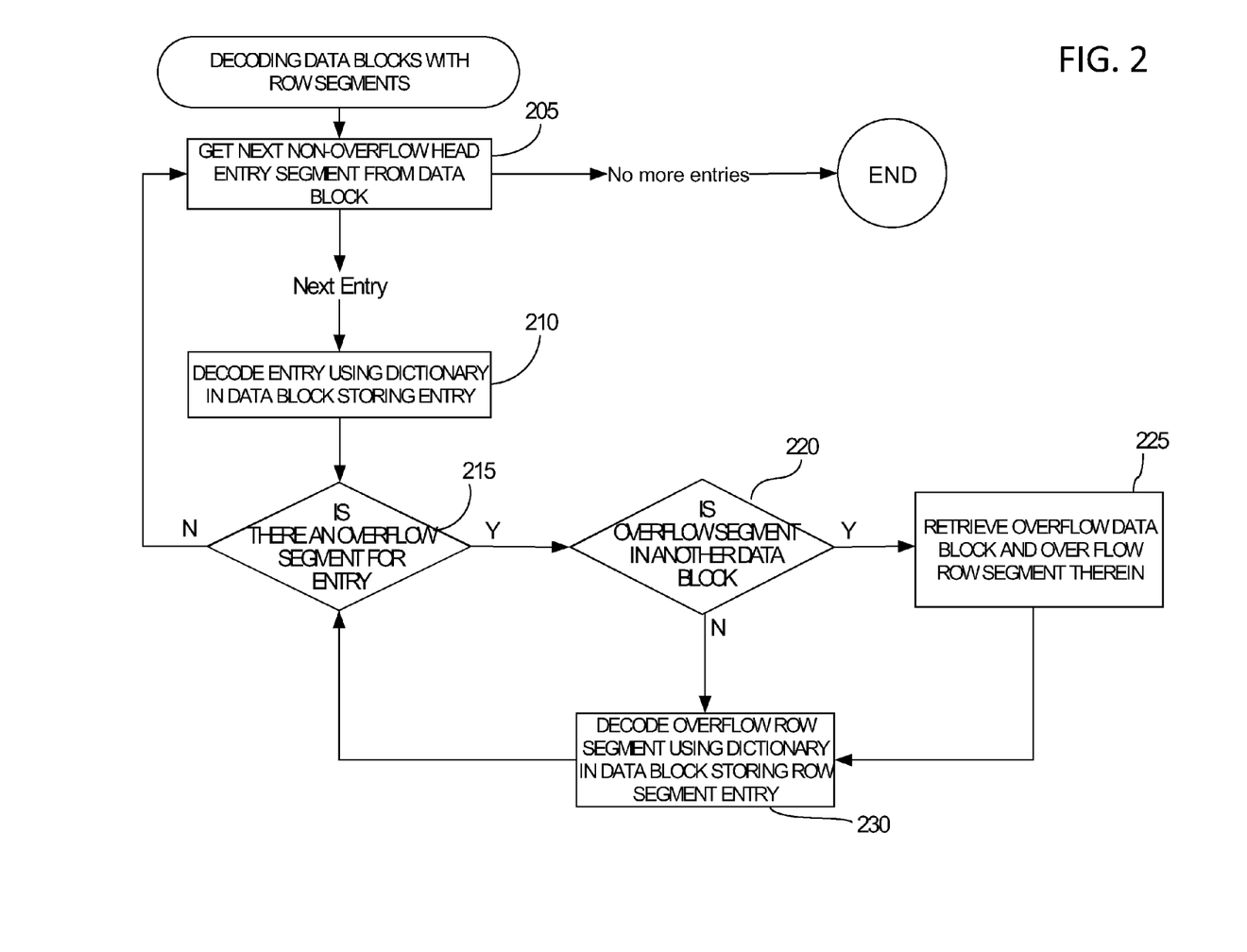
FIG. 2 is a flow chart depicting a procedure for decoding a row-segmented data block.

FIG. 2 shows an exemplary procedure for decoding data blocks with row segments compressed using dictionary compression. The procedure is performed by a database server performing a database operation to access data blocks to retrieve rows. Such database operations include, without limitation, a database server computing a database query in response to receiving a request to compute a query. The procedure decodes all column values of each row contained in a data block. The procedure is illustrated using data block 110 and data block 130 and begins with the row entry row 121.

Referring to FIG. 2, at operation 205, the database server retrieves the next row entry for a non-overflow row in data block 110, row 121. At operation 210, row 121 is decoded using token dictionary 112 in data block 110.

Next, at 215, the database server determines whether row 121 is linked to a subsequent overflow row. Because row 121 is non-segmented, row 121 is not linked to a subsequent overflow row. In response to determining that row 121 is not linked to a subsequent overflow row, the procedure proceeds to operation 205 to retrieve the next entry for a non-overflow row in data block 110, row segment 122-1.

At 205, row segment 122-1 is decoded using token dictionary 112. Next, the database server determines that row 122-1 is a segmented row that is linked to a subsequent overflow row. In response to the determination that row 122-1 is linked to a subsequent overflow row, at 220, the database server determines whether the overflow row to which segmented row 122-1 is linked is stored in another data block. Using the row link in row segment 122-1, the database server determines that the data block containing the over flow row segment is another data block, which is data block 130. At 225, the database server retrieves data block 130 and over flow row segment 122-2 from data block 130.

The procedure proceeds to operation 230. At 230, the database server decodes the row segment 122-2 using token dictionary 132, the data block level token dictionary contained in the data block that stores row segment 122-2, data block 130.

The procedure proceeds to operation 215. At 215, the database server determines row 122-2 is not linked to a subsequent overflow row. Therefore, the procedure flows to operation 205, where the database server gets the next entry for a non-overflow row, row segment 123. The procedure flows to operation 210.

At 210, row segment 123-1 is decoded using token dictionary 112. Next, the database server determines that row 123-1 is a segmented row that is linked to a subsequent overflow row. In response to the determination that row 123-1 is linked to a subsequent overflow row, at 220, the database server determines whether the overflow row to which segmented row 123-1 is linked stored in another data block. Using the row link in row segment 123-1, the database server determines that the data block containing the over flow row segment is in the same data block 110. The procedure proceeds to operation 230.

At 230, the database server decodes the row segment 123-2 using token dictionary 112, the data block level token dictionary contained in the data block that stores row segment 123-2, data block 110. The procedure continues on but is not further illustrated herein.

A feature of decoding data blocks with row segments is that only the block level token dictionary in the data block that stores a row segment is used to decode the row segment and not the data block level token dictionary of any of data block storing another row segment of the same row. Only the block level token dictionary in the data block that stores row entries is used to encode the row entries or in other words, the columns values in the data blocks.

Other types of database operations use token dictionaries to decode or encode rows and row segments. For example, a row that is being inserted into a table is stored as a spanning row. The head row segment is stored in a first data block and is encoded according to the token dictionary stored in the first data block. Storing the head row segment may entail creating entries in the token dictionary that each map a token to a column value. Similarly, an over flow row segment is stored in an overflow data block. Storing the over flow row segment may entail creating entries in the overflow block's token dictionary that each map a token to a column value.

Finally, when performing a database operation to retrieve segmented rows encoded by the token dictionary, the entirety of the row need not be decoded. For example, a database operation may entail a projection of a column in an over flow row segment or predicate evaluation of a column in an overflow row segment. The head row segment may not be decoded, only the over flow row segment, or just a portion of the over flow row segment containing the column.

Hardware Overview

According to one embodiment, the techniques described herein are implemented by one or more special-purpose computing devices. The special-purpose computing devices may be hard wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
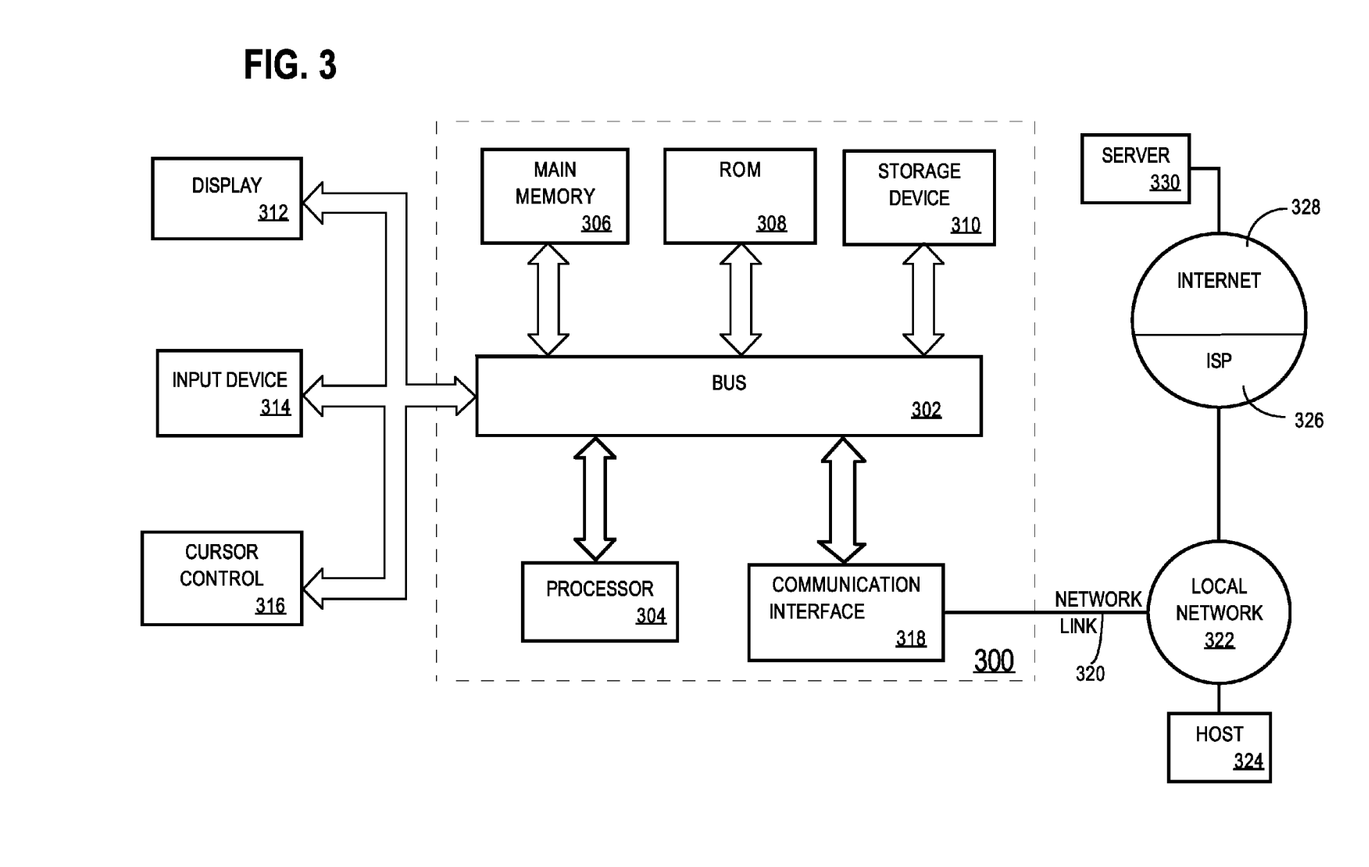
FIG. 3 is a diagram of a computer system that is used in an embodiment of the present invention.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising steps of:
   a database server storing a plurality of rows in a plurality of data blocks, wherein storing said plurality of data blocks includes:
   compressing said plurality of rows in said plurality of data blocks using token dictionary compression and a plurality of token dictionaries; and
   wherein said plurality of rows includes a plurality of segmented rows, each segmented row of said plurality of segmented rows comprising a plurality of chained row segments, each row segment of said plurality of chained row segments containing one or more column values of said each segmented row;
   wherein each data block of said plurality of data blocks stores a respective token dictionary of said plurality of token dictionaries that maps tokens only to column values stored in said each data block;
   wherein a particular segmented row of particular segmented rows in a first data block of said plurality of data blocks comprises a first row segment stored in said first data block and a second row segment that is stored in a second data block of said plurality of data blocks, wherein said first row segment is stored in association with a row segment link that refers to said second row segment and that is stored in said first data block;
   wherein said first row segment is encoded according to the respective token dictionary stored in said first data block and wherein said second row segment is encoded according to the respective token dictionary stored in said second data block.

2. The method of claim 1, the steps further including decoding said particular segmented row, wherein decoding said particular row segment includes decoding said first row segment according to the respective token dictionary of said first data block and decoding said second row segment according to the respective token dictionary of said second data block.

3. The method of claim 1, wherein a first segmented row of said plurality of segmented rows comprises at least two row segments stored in a same data block of said plurality of data blocks.

4. The method of claim 1, wherein a first segmented row of said plurality of segmented rows comprises at least two row segments stored in different data blocks of said plurality of data blocks.

5. A non-transitory computer-readable medium storing one or more instructions which when executed by one or more processors cause:

a database server storing a plurality of rows in a plurality of data blocks, wherein storing said plurality of data blocks includes:

compressing said plurality of rows in said plurality of data blocks using token dictionary compression and a plurality of token dictionaries; and     wherein said plurality of rows includes a plurality of segmented rows, each segmented row of said plurality of segmented rows comprising a plurality of chained row segments, each row segment of said plurality of chained row segments containing one or more column values of said each segmented row;

wherein each data block of said plurality of data blocks stores a respective token dictionary of said plurality of token dictionaries that maps tokens only to column values stored in said each data block;

wherein a particular segmented row of a particular segmented rows in a first data block of said plurality of data blocks comprises a first row segment stored in said first data block and a second row segment that is stored in a second data block of said plurality of data blocks, wherein said first row segment is stored in association with a row segment link that refers to said second row segment and that is stored in said first data block;

wherein said first row segment is encoded according to the respective token dictionary stored in said first data block and wherein said second row segment is encoded according to the respective token dictionary stored in said second data block.

6. The non-transitory computer-readable medium of claim 5, the one or more instructions including instructions that, when executed by said one or more processors, cause decoding said particular segmented row, wherein decoding said particular row segment includes decoding said first row segment according to the respective token dictionary of said first data block and decoding said second row segment according to the respective token dictionary of said second data block.

7. The non-transitory computer-readable medium of claim 5, wherein a first segmented row of said plurality of segmented rows comprises at least two row segments stored in a same data block of said plurality of data blocks.

8. The non-transitory computer-readable medium of claim 5, wherein a first segmented row of said plurality of segmented rows comprises at least two row segments stored in different data blocks of said plurality of data blocks.

\* \* \* \* \*

UNITED STATES PATENT AND TRADEMARK OFFICE
CERTIFICATE OF CORRECTION

PATENT NO. : 9,646,053 B2
APPLICATION NO. : 13/797063
DATED : May 9, 2017
INVENTOR(S) : Marwah et al.

Page 1 of 1

It is certified that error appears in the above-identified patent and that said Letters Patent is hereby corrected as shown below:

On page 2, Column 1, under Other Publications, Line 1, delete ""Fundatmentals" and insert -- "Fundamentals --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*